(12) United States Patent
Buentello et al.

(10) Patent No.: US 11,902,463 B1
(45) Date of Patent: *Feb. 13, 2024

(54) SYSTEMS AND METHODS FOR DETECTING FRAUDULENT CALLS USING VIRTUAL ASSISTANTS

(71) Applicant: United Services Automobile Association (USAA), San Antonio, TX (US)

(72) Inventors: Andre Rene Buentello, San Antonio, TX (US); Mark Anthony Lopez, Helotes, TX (US); Gregory Brian Meyer, Plano, TX (US); Ashley Raine Philbrick, San Antonio, TX (US); Garrett Rielly Rapport, San Antonio, TX (US); Jose L. Romero, Jr., San Antonio, TX (US); Michael Jay Szentes, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,388

(22) Filed: Dec. 21, 2022

Related U.S. Application Data

(63) Continuation of application No. 17/236,820, filed on Apr. 21, 2021, now Pat. No. 11,539,834, which is a continuation of application No. 16/751,904, filed on Jan. 24, 2020, now Pat. No. 11,102,344.

(60) Provisional application No. 62/798,912, filed on Jan. 30, 2019.

(51) Int. Cl.
H04M 3/22 (2006.01)
H04M 3/51 (2006.01)
H04M 3/523 (2006.01)

(52) U.S. Cl.
CPC ....... *H04M 3/2281* (2013.01); *H04M 3/5175* (2013.01); *H04M 3/5191* (2013.01); *H04M 3/5232* (2013.01); *H04M 2203/6027* (2013.01)

(58) Field of Classification Search
None
See application file for complete search history.

(56) References Cited

U.S. PATENT DOCUMENTS

| 8,924,285 | B2 | 12/2014 | Rajakumar et al. |
| 9,852,424 | B2 | 12/2017 | Broman et al. |
| 10,484,532 | B1 | 11/2019 | Newman et al. |
| 11,102,344 | B1 * | 8/2021 | Buentello ............ H04M 3/527 |
| 11,539,834 | B1 * | 12/2022 | Buentello ........... H04M 3/5335 |

(Continued)

*Primary Examiner* — Quoc D Tran
(74) *Attorney, Agent, or Firm* — Fletcher Yoder, P.C.

(57) ABSTRACT

A system may include a processor that may execute computer-executable instructions that cause the processor to receive caller information regarding an incoming communication from a caller and receive a request from a user to route the incoming communication to a virtual assistant application. The virtual assistant application is configured to interact with the caller and determine whether the caller is associated a fraudulent caller activity stored on databases accessible by the processor. The processor may then receive an indication from the virtual assistant application that the caller is associated with the fraudulent caller activity and forward the incoming communication to another party in response to receiving the indication.

20 Claims, 4 Drawing Sheets

(56) References Cited

U.S. PATENT DOCUMENTS

| | | |
|---|---|---|
| 2012/0053939 A9 | 3/2012 | Gutierrez et al. |
| 2013/0268470 A1 | 10/2013 | Yablokov et al. |
| 2018/0097841 A1 | 4/2018 | Stolarz et al. |
| 2018/0131799 A1 | 5/2018 | Kashimba et al. |
| 2018/0205726 A1 | 7/2018 | Chari et al. |
| 2018/0240028 A1 | 8/2018 | Baracaldo Angel et al. |
| 2018/0270348 A1* | 9/2018 | Li ................. H04M 3/42059 |
| 2019/0020759 A1 | 1/2019 | Kuang |
| 2020/0137221 A1 | 4/2020 | DelloStritto et al. |

* cited by examiner

SYSTEMS AND METHODS FOR DETECTING FRAUDULENT CALLS USING VIRTUAL ASSISTANTS

CROSS REFERENCE TO RELATED APPLICATIONS

The present disclosure is a continuation of and claims priority to U.S. patent application Ser. No. 17/236,820, filed Apr. 21, 2021, titled "Systems and Methods for Detecting Fraudulent Calls using Virtual Assistants," which is a continuation of and claims priority to U.S. patent application Ser. No. 16/751,904, filed Jan. 24, 2020, titled "Systems and Methods for Detecting Fraudulent Calls using Virtual Assistants," which claims priority to U.S. Provisional Patent Application No. 62/798,912, entitled "Systems and Methods for Detecting Fraudulent Calls using Virtual Assistants," filed Jan. 30, 2019, the entireties of which are incorporated by reference into the present disclosure.

BACKGROUND

The present disclosure relates generally to detecting fraudulent activity received via telephone calls. More specifically, the present disclosure relates to analyzing certain behavior to detect and predict potential fraudulent actors associated with a caller.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Gaining access to private information via hacking or fraud is a well-established and growing problem. There are many systems of communication that are targets for hacking and fraudsters desire for private data. For example, potential fraudsters or individuals who pose as an existing client may contact an individual via a phone call to offer services, collect information, present financial opportunities, or the like. Some individuals who receive these calls may be unaware of the potential fraudulent nature of the call. Indeed, certain individuals may provide the caller with information that may then be used to perform fraudulent activities (e.g., identity theft) against the call recipient. As such, improved systems and methods for efficiently and effectively detecting potential fraudsters and fraudulent activities are desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a processor that may execute computer-executable instructions that cause the processor to receive caller information regarding an incoming communication from a caller and receive a request from a user to route the incoming communication to a virtual assistant application. The virtual assistant application is configured to interact with the caller and determine whether the caller is associated a fraudulent caller activity stored on databases accessible by the processor. The processor may then receive an indication from the virtual assistant application that the caller is associated with the fraudulent caller activity and forward the incoming communication to another party in response to receiving the indication.

In another embodiment, a non-transitory computer-readable medium may include computer-executable instructions that, when executed, are configured to cause a processor to receive first audio data associated with an incoming communication from a caller. The instructions then cause the processor to output second audio data configured to interact with the caller and receive third audio data after the second audio data is output. The processor may then determine whether the caller is associated with at least one of one or more fraudulent caller activities stored on one or more databases accessible by the processor based on the first audio data and the third audio data. The processor may also present a visualization indicative of the caller being associated with the at least one of the one or more fraudulent caller activities in response to determining that the caller is associated with the at least one of one or more fraudulent caller activities.

In yet another embodiment, a method may include receiving, via a processor, first audio data associated with a voicemail message from an incoming communication of a caller. The method may then include determining whether the caller is associated with at least one of one or more fraudulent caller activities stored on one or more databases accessible by the processor based on the first audio data. The method may also include deleting the voicemail message in response to determining that the caller is associated with at least one of one or more fraudulent caller activities.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, individuals are increasingly becoming victims to various types fraudulent activities that are aimed at gaining access to private information, providing an opportunity to invest in a fraudulent fund, provide predatory credit loans, solicit for donation to fraudulent charities, or the like. To prevent individuals from continuously receiving calls from potential scammers, the presently disclosed embodiments detail certain systems and methods for identifying potential fraudulent callers and directing these callers to a virtual assistant application. The virtual assistant application may cross reference data (e.g. audio, phone number) related to the received call with data related to known fraudulent calls to identify potential fraudulent callers. In addition, the virtual assistant application may include an artificial intelligence module or component that may generate simulated voice audio that may be provided to the caller. The simulated voice audio may be designed to prompt the caller to provide certain details regarding the purpose of his or her call, such that the virtual assistant application may better gauge whether the call is likely related to a fraudulent activity.

Figure 1:
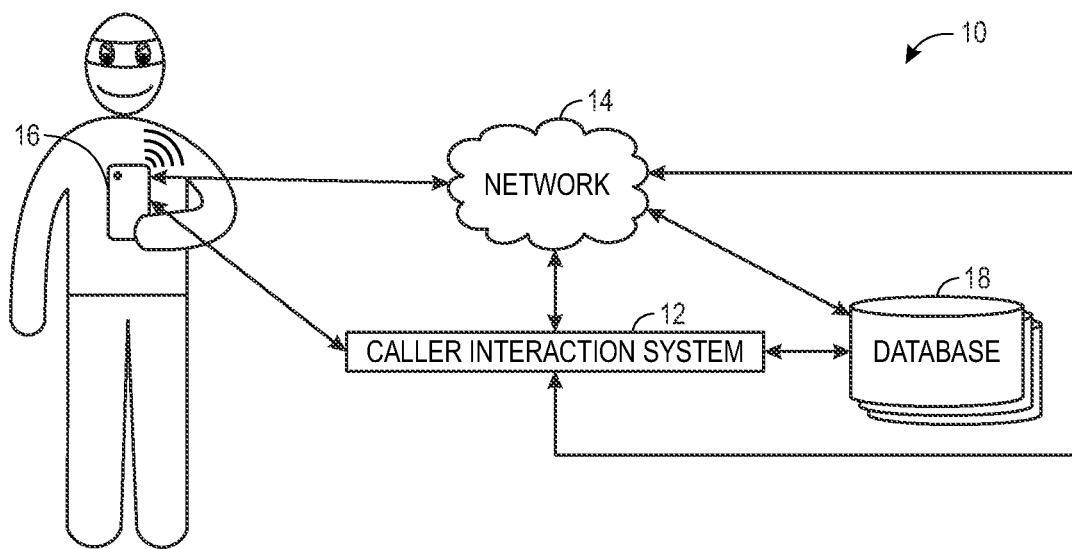
FIG. 1 illustrates a caller interaction network, in accordance with embodiments described herein.

By way of introduction, FIG. 1 illustrates a caller interaction network 10 that includes certain components, electronic devices, and a collection of electronic devices that enable a caller interaction system to perform the methods described herein. As shown in FIG. 1, the caller interaction network 10 may include a caller interaction system 12 that may be communicatively coupled to a network 14. The network 14 may be any suitable computer network that enables different electronic devices to communicate with each other. As such, the network 14 may include a collection of computing devices (e.g., servers), communication components (e.g., routers), and the like that facilitate the interconnections between the caller interaction system 12 and other components that may be part of the caller interaction network 10.

Figure 2:
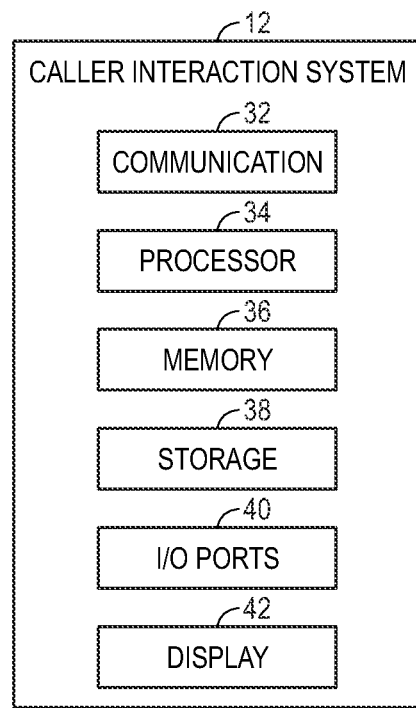
FIG. 2 illustrates a block diagram of a caller interaction system employed by the caller interaction network of FIG. 1, in accordance with embodiments described herein.

The caller interaction system 12 may be any suitable computing device, which is discussed in more detail below with reference to FIG. 2. In certain embodiments, the caller interaction system 12 may be a mobile phone or smartphone that is capable of receiving voice phone calls over cellular towers, satellites, or other suitable telecommunication mediums.

A potential fraudster may interact with a user via using an electronic device 16. The electronic device 16 may be any suitable computing device such as a mobile computing device (e.g., smart phone, tablet), a laptop computer, a personal computer, and the like. The potential fraudster may thus interact with a user of the caller interaction system 12 via text messaging, real-time chat messaging applications, electronic mail, voice-over internet protocol, phone call, and the like. In addition, the electronic device 16 may include a telephone (e.g., without network connectively) used to call the user.

With the foregoing in mind, the caller interaction system 12 may receive a call, text message, voicemail, or other suitable form of communication from the electronic device 16. After receiving the call, the caller interaction system 12 may proceed to evaluate the call to determine whether the caller originating the call is attempting to defraud the user of the caller interaction system 12, provide unsolicited information to the user, is an unwanted caller for the user, or the like. Additional details with regard to the process undertaken by the caller interaction system 12 to evaluate the call will be discussed below with reference to FIGS. 3-5.

In some embodiments, to perform its respective operations, the caller interaction system 12 may retrieve data from one or more databases 18. The databases 18 may include data concerning the user of the caller interaction system 12, certain known fraudulent techniques or processes, a list of telephone numbers identified as potential fraudsters, a health database that includes information about prescriptions associated with the user, a drug database including a list of drugs that are approved by the Food and Drug Administration (FDA), a list of drugs approved for clinical trials, and the like. In addition, the databases 18 may be affiliated with other organizations that may have access to data concerning fraud trends, news sources, information concerning compromised or hacked accounts in various organizations, and the like. The databases 18 may also include crowd source data that indicates how other users have classified certain caller identification information (e.g., phone number), voice messages, and the like. Additional details with regard to the databases 18 and the sources of data for the databases 18 will be discussed below with reference to FIGS. 3, 4, and 5.

In certain embodiments, the electronic device 16 and the databases 18 may be in direct communication with the caller interaction system 12 via a respective communication channel. However, it should be noted that each of the aforementioned devices may also be coupled to each other via the network 14, as discussed above To perform some of the operations described in the present disclosure, the caller interaction system 12 may include certain components to facilitate these operations. With this in mind, FIG. 2 is a block diagram of example components within the caller interaction system 12. Referring to FIG. 2, the caller interaction system 12 may include a communication component 32, a processor 34, a memory 36, a storage 38, input/output (I/O) ports 40, a display 42, and the like. The communication component 32 may be a wireless or wired communication component that may facilitate communication between the caller interaction system 12, the network 14, the electronic device 16, the databases 18, and the like.

The processor 34 may be any type of computer processor or microprocessor capable of executing computer-executable code. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store data, analysis of acquired data, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse, microphone), sensors, input/output (I/O) modules, and the like. The display 42 may operate to depict visualizations associated with software or executable code being processed by the processor 34. In one embodiment, the display 42 may be a touch display capable of receiving inputs from a user of the caller interaction system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the caller interaction system 12.

It should be noted that the components described above with regard to the caller interaction system 12 are exemplary components and the caller interaction system 12 may include additional or fewer components as shown. Additionally, it should be noted that the electronic device 16 may also include similar components as described as part of caller interaction system 12.

Although the embodiments described herein are detailed as being performed by the caller interaction system 12, it should be noted that the presently disclosed techniques may be performed in conjunction with a cloud-based computing system, a server, or the like. That is, the caller interaction system 12 may receive a call or communication message via a telecommunication channel, and the caller interaction system 12 may perform some analysis or operations described herein with the additional computing resources provided by a server, a cloud-computing system, or the like. In some embodiments, the caller interaction system 12 may use a computing application, which may be stored in the memory 36, and executed by the processor 34 to perform the embodiments described herein. The computer application may access the computing resources of the caller interaction system 12 to perform its operations or interact with the computing resources of another connected computing system (e.g., cloud-computing system). In any case, for the purposes of discussion, the presently disclosed techniques will be described as being performed by the caller interaction system 12. As such, it should be understood that the presently disclosed techniques are not limited to being performed by the caller interaction system 12.

Figure 3:
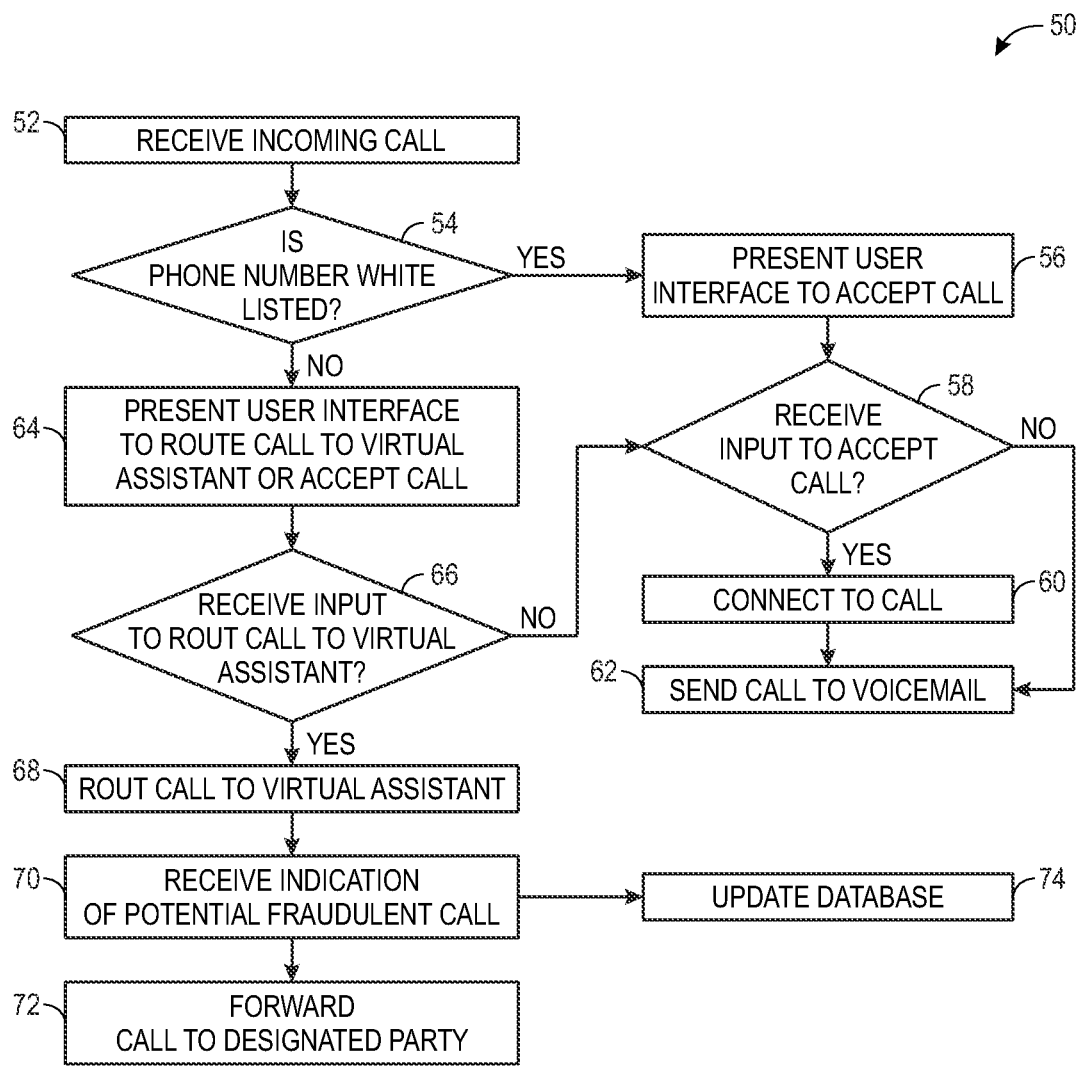
FIG. 3 illustrates a flow chart of a method for routing potentially fraudulent calls to a virtual assistant, in accordance with embodiments described herein.
Figure 4:
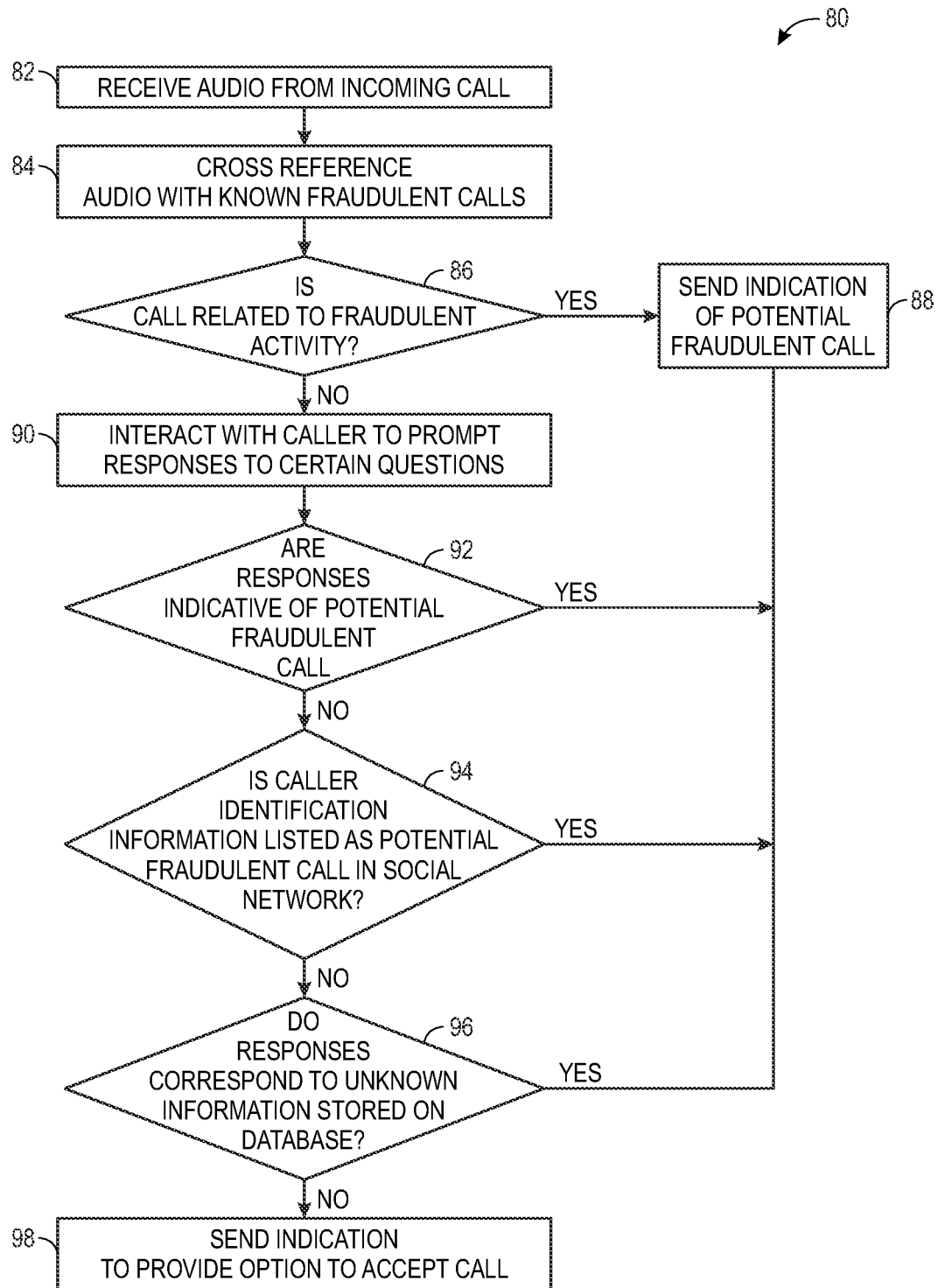
FIG. 4 illustrates a flow chart of a method for determining whether a received call is related to a fraudulent activity, in accordance with embodiments described herein.

Keeping the foregoing in mind, FIG. 3 illustrates a flow chart of a method 50, the caller interaction system 12 may intercept calls received from potential fraudsters to screen the calls before forwarding or connecting the call to the user. It should be noted that although the method 50 is described below in a particular order, it should be understood that the method 50 may be performed in any suitable order.

Referring now to FIG. 3, at block 52, the caller interaction system 12 may receive an incoming call from a caller. The incoming call may be received from any suitable communication device including a mobile phone, a computing device, or the like. At block 54, the caller interaction system 12 may determine whether the phone number or caller identification information associated with the incoming call is part of a list of identifications that have been whitelisted. The whitelist of identification information may be generated based on a user-defined indication of a previously received call having the same caller identification as being desired or undesired. If the caller identification information is listed or marked as being desired, the caller and/or the associated caller identification may be stored as a whitelisted contact. In addition, the databases 18 may include a list of caller identification information (e.g., phone number, email address, text message numbers) that other users have previously listed as whitelisted numbers, potential fraudsters, unwanted calls, or the like.

If the caller identification information is present on a whitelist, the caller interaction system 12 may proceed to block 56. At block 56, the caller interaction system 12 may present a user interface visualization that enables the user to accept or reject the incoming call. At block 58, the caller interaction system 12 may receive an input from the user via the I/O ports 40 or the display 42 indicative of whether the user provides an input that corresponds to receiving the call. If the user indicates to the caller interaction system 12 that he intends to receive the call, the caller interaction system 12 may proceed to block and communicatively couple the caller interaction system 12 to the caller. If the user indicates to the caller interaction system 12 that he does not wish to receive the call, the caller interaction system 12 may proceed to block 62 and communicatively couple the caller to a voice message system where the caller may record a message for the user.

Returning to block 54, if the call information is not whitelisted, the caller interaction system 12 may proceed to block 64 and present a user interface visualization that enables the user to route the caller to a virtual assistant application or accept the call (e.g., as incoming call or for voicemail). At block 66, the caller interaction system 12 may receive an input with regard to routing the incoming call to the virtual assistant application. If the user indicates that the call should not be routed to the virtual assistant application, the caller interaction system 12 may proceed to block 58 and perform the corresponding operations described above.

If, at block 66, the user indicates that the call should be routed to the virtual assistant application, the caller interaction system 12 may proceed to block 68 and route the caller to the virtual assistant application. The virtual assistant application may be a program or a set of computer-executable code that analyzes incoming call to determine whether the incoming call is associated with a potential fraudster.

In some embodiments, the virtual assistant application may cross reference the incoming caller identification information with data stored on the databases 18 or in the memory 36 or storage 38 of the caller interaction system 12 to determine whether the caller identification information (e.g., phone number) corresponds with a fraudulent actor or suspected fraudulent actor. That is, the user of the caller interaction system 12 may be listed as a potential fraudster by the user based on a previous interaction with the caller. In addition, the caller identification information may be listed on the databases 18, which include a list of information that corresponds to other users indicating that the caller information corresponds to suspected fraudulent activity. In this way, the databases 18 may enable the user to leverage the collective review of a number of other individuals who previously interacted with the caller to assist in filtering the incoming call as a potential fraudster. Additional details with regard to how the virtual assistant application may determine whether the caller is likely a fraudster will be described below with reference to FIG. 4.

At block 70, the caller interaction system 12 may receive an indication from the virtual assistant application that the caller may be a potential fraudulent call. The caller interaction system 12 may then, at block 74, update the databases 18 or the memory 36/storage 38 to enable other users or the user of the caller interaction system 12 to identify the fraudulent caller more quickly. In some embodiments, the caller interaction system 12 may proceed to block 72 and forward the call to a designated party. For example, if the user is a senior citizen or an individual who may be more susceptible to fraudulent calls, the user may designate another individual (e.g., adult child, caretaker) to receive the call and interface with the caller before forwarding the call to the user.

As mentioned above, FIG. 4 illustrates a method 80 that may be employed by the virtual assistant application or the caller interaction system 12 to determine whether the incoming caller is associated with a potentially fraudulent entity Like the method 50, the following description of the method 80 may be performed in any suitable order and by any suitable computing device. For the purposes of discussion, the method 80 will be described as being performed by the virtual assistant application.

At block 82, the virtual assistant application may receive audio data and caller information regarding the incoming call. The audio data may include the voice or audio provided to the caller interaction system 12 via phone call or voicemail message. At block 84, the virtual assistant application may cross reference the audio data and the caller identification information with known fraudulent calls that may be stored in the memory 36, the storage 38, the databases 18, or the like. In some embodiments, the audio data may include substantially similar audio waveforms that correspond to other calls that have been classified as fraudulent. That is, fraudulent calls may often be made by a machine or system that provides a recorded message. This recorded message may be received by other users that may identify the caller as fraudulent.

In addition, the audio data may include a sound effect (e.g., click) or particular sound waveform that may correspond to an automatic calling machine switching over to a live caller. In this way, the virtual assistant application may answer the incoming call to allow the machine to switch over, thereby verifying to the virtual assistant application that the caller is likely calling via a robot caller that automatically calls a list of phone numbers. The calls that originate from robots or machines may more likely be associated with a fraudulent caller seeking to randomly gain access to an individual's information or solicit agreement from a random user for a fraudulent scheme.

At block 86, the virtual assistant application may determine whether the incoming call is related to fraudulent activity based on the analysis performed at block 84. If the caller is associated with fraudulent activity, the virtual assistant application may proceed to block 88 and send an indication of the potentially fraudulent call to the caller interaction system 12, as described above with respect to block 70 of FIG. 3.

If the virtual assistant application determines that the call is not related to fraudulent activity based on the analysis of block 84, the virtual assistant application may proceed to block 90 and interact with the caller. That is, at block 84, the virtual assistant application may include an artificial intelligence module or a list of audio files that enable the virtual assistant application to begin a pseudo conversation with the caller using natural language.

In some embodiments, the audio files may include various greetings to initiate the call. The virtual assistant application may use a number of audio files to solicit responses from the caller. For example, the audio files may request that the caller provide an indication of the purpose of the call. The audio files may provide audio that provides a certain context that corresponds to the user's schedule. For example, the audio may indicate that the user is communicating with a poor mobile phone link and needs to know what they caller is seeking. Alternatively, the audio may indicate that the user is about to join a meeting or start a class or perform some activity and has a limited amount of time to discuss the caller's purpose.

In other embodiments, the artificial intelligence module or the virtual assistant application may generate a series of voice responses to the caller's request based on one or more responses that the user may have pre-defined as being acceptable. In this way, the virtual assistant application may allow the caller to proceed with a sales pitch or other relevant data regarding his call to enable the virtual assistant application to make a better determination as to whether the call is related to fraud. That is, as the caller provides additional requests or audio data for sampling, the virtual assistant application may gather additional information to determine whether the caller is related to a fraudulent activity.

At block 92, the virtual assistant application may determine whether the responses to the inquiries or audio provided by the virtual assistant application at block 90 correspond to properties of a potentially fraudulent call. In one embodiment, the virtual assistant application may repeat the analysis performed at block 84 using the additional data acquired after block 90.

In other embodiments, the virtual assistant application may determine whether the responses provided by the caller corresponds to potential fraudulent activity. For example, if the audio data provided by the caller corresponds to expected responses associated with fraudulent callers, the virtual assistant application may determine that the caller is likely associated with fraudulent activity. It should be noted that the embodiments described herein are not limited to identifying fraudulent callers. Indeed, the embodiments described herein may also be used to avoid nuisance callers, unsolicited marketing callers, and the like. By way of example, if the responses indicate that the user may be eligible to earn additional income or may be paying too much for a certain service, the virtual assistant application may identify these calls as unsolicited callers that are undesired by a majority of the users that indicated that the respective callers were undesired according to the data stored in the databases 18.

In another embodiment, the virtual assistant application determine whether the grammar used by the caller corresponds to a grammar signature of an individual that corresponds to a stored audio file or profile associated with a fraudulent call. For example, the virtual assistant application may capture calls and convert the spoke speech to text. The virtual assistant application may then compare the captured calls for a number of users to extract language usage rules (e.g., gender) about the individual, who may be later designated as trusted. The language usage rules or grammar signature about the individual may be stored and used for comparison to future interactions to provide a probability score indicative of whether the caller currently on the phone corresponds to the same individual in which the grammar signature was created.

If, at block 92, the virtual assistant application determines that the responses are indicative of a potential fraudulent call, the virtual assistant application may proceed to block 88 and send an indication of the potential fraudulent call as described above. If the virtual assistant application determines that the responses are not indicative of potential fraudulent call, the virtual assistant application may proceed to block 94 and continue the method 80.

At block 94, the virtual assistant application may determine whether the caller identification information is listed or associated with a fraudulent activity in a social network. In some embodiments, the databases 18 may include data related to the social network of the user. That is, certain social networking websites and applications may provide information regarding the user's connections or other users that are connected to the user. The social network of the user may assist the virtual assistant application to determine whether a received call is potentially fraudulent. In certain embodiments, the virtual assistant application may determine whether other users connected to the user of the caller interaction system 12 received a similar call or a call having the same caller identification number. In some cases, when individuals of the same social network receive the same call, the call may be related to a fraud relying on a common contact between the respective users.

In addition, the virtual assistant application may query the whitelist and the identified fraudsters of the users connected to the user of the caller interaction system 12 to determine how the other users categorized the respective caller. The virtual assistant application may use the other user's responses, which may be stored in the databases 18, to determine how the user of the caller interaction system 12 would assess the call.

If the virtual assistant application determines that the caller identification information is associated with a known or suspected fraudulent activity based on the social network of the user, the virtual assistant application may proceed to block 88. Alternatively, the virtual assistant application may proceed to block 96.

At block 96, the virtual assistant application may determine whether the responses received from the caller correspond to known information. That is, the databases 18 and/or the memory 36/storage 38 may include data regarding the user that is generally available via electronic sources (e.g., websites, government lists). For example, if the caller's responses include data concerning properties owned by the user and the property data is stored in a property tax website, the virtual assistant application may determine that the caller may potentially be fraudulent. If the virtual assistant application determines that the responses from the caller correspond to known information, the virtual assistant application may proceed to block 88. Alternatively, the virtual assistant application may proceed to block 98 and send an indication to the caller interaction system 12 to provide an option to accept the call or send the caller to voice mail.

Figure 5:
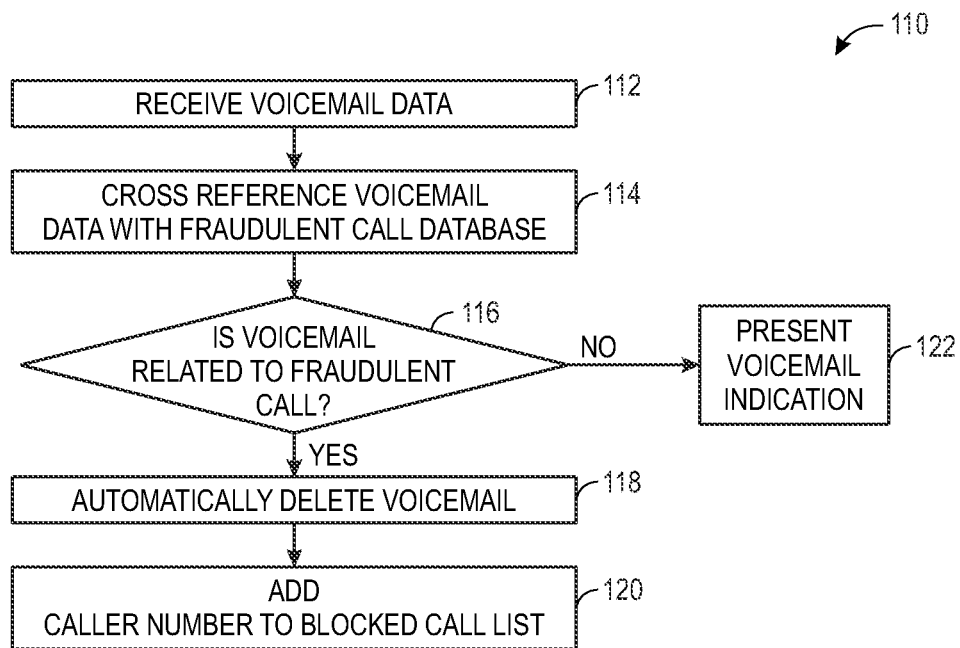
FIG. 5 illustrates a flow chart of a method for determining whether received voicemails are related to a fraudulent activity.

In some embodiments, the presently disclosed techniques may be performed on voicemail or text data received by the caller interaction system. By way of example, FIG. 5 illustrates a flow chart of a method 110 for analyzing voicemail data for potential fraud. Like the method 80 described above, the method 110 may be performed in any suitable order and by any suitable computing device. Although the following description of the method 110 is described with respect to voicemail data, the process may also be performed using any suitable communication message, such as a text message.

Referring now to FIG. 5, at block 112, the caller interaction system 12 may receive voicemail data. The voicemail data may include an audio message that corresponds to an unanswered call by the user. In some embodiments, the voicemail data may also include a transcription of the voicemail message sent to the user.

At block 114, the caller interaction system 12 may cross reference the audio data or transcribed data of the voicemail message with messages identified as fraudulent in the databases 18. If, at block 116, the caller interaction system 12 determines that the voicemail message is associated with a fraudulent caller, the caller interaction system 12 may proceed to block 118 and automatically delete the voicemail message. In addition, at block 120, the caller interaction system 12 may list the caller identification information associated with the caller of the voicemail message to a blocked call list to prevent the caller interaction system 12 from receiving calls from the caller again. It should be noted that the methods 50 and 80 may also be modified to automatically add callers identified as potential fraudsters to a block call list.

Returning to block 116, if the caller interaction system 12 determines that the voicemail is not related to a fraudulent call, the caller interaction system 12 may proceed to block 122 and present the indication of the voicemail for the user to access.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A method, comprising:
receiving, via a processor, an incoming communication from a caller;
receiving, via the processor, a request to route the incoming communication to a virtual assistant application, wherein the virtual assistant application is configured to:
interact with the caller; and
determine that the caller is associated with at least one fraudulent caller activity based on identifying a sound waveform indicative of an automatic calling machine;
receiving, via the processor, an indication from the virtual assistant application that the caller is associated with the at least one fraudulent caller activity; and
forwarding, via the processor, the incoming communication to another party in response to receiving the indication.

2. The method of claim 1, comprising updating, via the processor, a list with identification information associated with the caller in response to determining that the caller is associated with the at least one fraudulent caller activity, wherein the list is stored on a storage component accessible to the processor.

3. The method of claim 2, comprising:
receiving, via the processor, a second incoming communication from a second caller;
determining, via the processor, whether additional identification information associated with the second caller is stored in the list; and
blocking, via the processor, the second incoming communication in response to determining that the additional identification information associated with the second incoming communication is stored in the list.

4. The method of claim 3, wherein the virtual assistant application is configured to interact with the caller and the second caller using natural language.

5. The method of claim 1, wherein forwarding the incoming communication to the other party comprises:
identifying a communication device associated with an approved individual designated to receive the incoming communication and interact with the caller; and
forwarding the incoming communication to the communication device.

6. The method of claim 1, wherein the virtual assistant application is executable by the processor.

7. The method of claim 1, wherein the sound waveform corresponds to an automatic calling machine switching over to another caller.

8. A system, comprising:
one or more databases configured to store data associated with one or more fraudulent caller activities;
a computing device configured to execute computer-executable instructions that cause a processor to:
receive audio data associated with an incoming communication of a caller;
receive a request to route the incoming communication from the caller to a virtual assistant application, wherein the virtual assistant application is configured to:
interact with the caller; and
determine that the caller is associated with at least one of the one or more fraudulent caller activities based on identifying a sound waveform indicative of an automatic calling machine;
receive an indication from the virtual assistant application that the caller is associated with the at least one of the one or more fraudulent caller activities; and
forward the incoming communication to another party in response to receiving the indication.

9. The system of claim 8, where the computing device is configured to convert the audio data to text data, wherein the text data is stored in the one or more databases.

10. The system of claim 9, wherein the computing device is configured to extract language usage rules associated with the text data from the one or more databases to identify language rules that correspond to the one or more fraudulent caller activities.

11. The system of claim 10, wherein the computing device is configured to:
detect an additional incoming communication;
convert the additional incoming communication to additional text data;
compare the additional text data to the extracted language usage rules; and
block the additional incoming communication in response to determining that the additional text data is associated with the extracted language rules corresponding to the one or more fraudulent caller activities.

12. The system of claim 8, wherein the one or more databases comprise crowd source data acquired from a plurality of individuals, wherein the crowd source data comprises one or more phone numbers, one or more voice messages, or both classified as fraudulent by the plurality of individuals.

13. The system of claim 8, wherein forwarding the incoming communication to the other party comprises:
identifying a communication device associated with an approved individual designated to receive the incoming communication and interact with the caller; and
forwarding the incoming communication to the communication device.

14. A non-transitory computer-readable medium comprising computer-executable instructions that, when executed, are configured to cause a processor to:
receive audio data associated with an incoming communication of a caller;
receive a request to route the incoming communication from the caller to a virtual assistant application, wherein the virtual assistant application is configured to:
interact with the caller; and
determine that the caller is associated with one or more fraudulent caller activities based on identifying a sound waveform indicative of an automatic calling machine;
receive an indication from the virtual assistant application that the caller is associated with at least one of the one or more fraudulent caller activities; and
forward the incoming communication to another party in response to receiving the indication.

15. The non-transitory computer-readable medium of claim 14, wherein the computer-executable instructions are configured to cause the processor to:
receive an additional incoming communication;
determine whether additional identification information associated with the additional incoming communication is associated with the one or more fraudulent activities; and
block the additional incoming communication in response to determining that the additional identification information associated with the additional incoming communication is stored in the one or more databases associated with the one or more fraudulent activities.

16. The non-transitory computer-readable medium of claim 14, wherein the virtual assistant application is configured to interact with the caller using natural language.

17. The non-transitory computer-readable medium of claim 14, wherein the virtual assistant application is configured to interact with the caller using one or more audio samples.

18. The non-transitory computer-readable medium of claim 14, wherein the computer-executable instructions are configured to cause the processor to add caller identification information associated with the caller identified as being related to the at least one fraudulent activity to a blocked call list.

19. The non-transitory computer-readable medium of claim 14, wherein the sound waveform corresponds to an automatic calling machine switching over to another caller.

20. The non-transitory computer-readable medium of claim 14, wherein forwarding the incoming communication to the other party comprises:
- identifying a communication device associated with an approved individual designated to receive the incoming communication and interact with the caller; and
- forwarding the incoming communication to the communication device.

\* \* \* \* \*